Oct. 16, 1928.

R. T. PIERCE 1,687,692

ELECTRICAL METERING SYSTEM

Filed Jan. 2, 1924      3 Sheets-Sheet 3

WITNESSES:

INVENTOR
Raymond T. Pierce
BY
ATTORNEY

Patented Oct. 16, 1928.

1,687,692

UNITED STATES PATENT OFFICE.

RAYMOND T. PIERCE, OF EAST PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL METERING SYSTEM.

Application filed January 2, 1924. Serial No. 684,063.

My invention relates, in general, to electrical metering systems.

One of the objects of my invention is to provide an improved measuring instrument of the Kelvin balance type.

Another object of the invention is to provide improved means for indicating, at a central point, the load on a remotely-disposed circuit or plurality of circuits.

Another object of my invention is to provide improved means for controlling the movable member of a Kelvin balance magnetically in accordance with the load on the circuit associated with the balance.

Another object of my invention is to so arrange the Kelvin balance that, as the load varies, the magnetic balancing arrangement furnishes a uniform balancing torque.

Still another object of my invention is to provide an improved transmitting instrument of the variable-current type for remote metering systems.

There are other objects of the invention which together with the above, will be described in the detailed specification that is to follow.

In practicing my invention, I provide a Kelvin balance, the energy traversing the coils of which is to be recorded at a remote point. I provide an ordinary measuring or recording device at the remote point. In accordance with the operation of the Kelvin balance, the current supplied to the remotely-disposed instrument is varied. I further provide magnetic means connected in circuit with the remotely-disposed instrument for balancing the Kelvin balance and for rendering the device independent of changes in voltage.

Referring now to the drawings.

The same parts of the device in the various views are indicated by the same reference characters.

Figure 4:
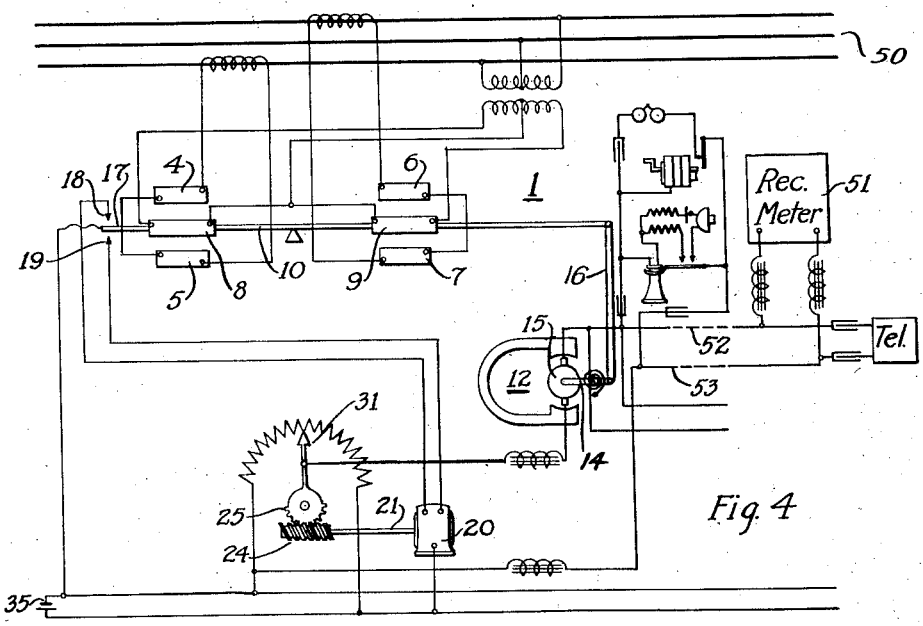
Fig. 4 is a diagram of the circuit connections in a system to which my invention is applied.

In a measuring system embodying my invention, I provide a sending device 1, such as an ordinary Kelvin balance type of wattmeter, which controls means for varying the current applied to a remotely-disposed measuring instrument. The sending and receiving devices may be connected together over an ordinary telephone circuit, as shown in Fig. 4 of the drawings.

Figure 1:
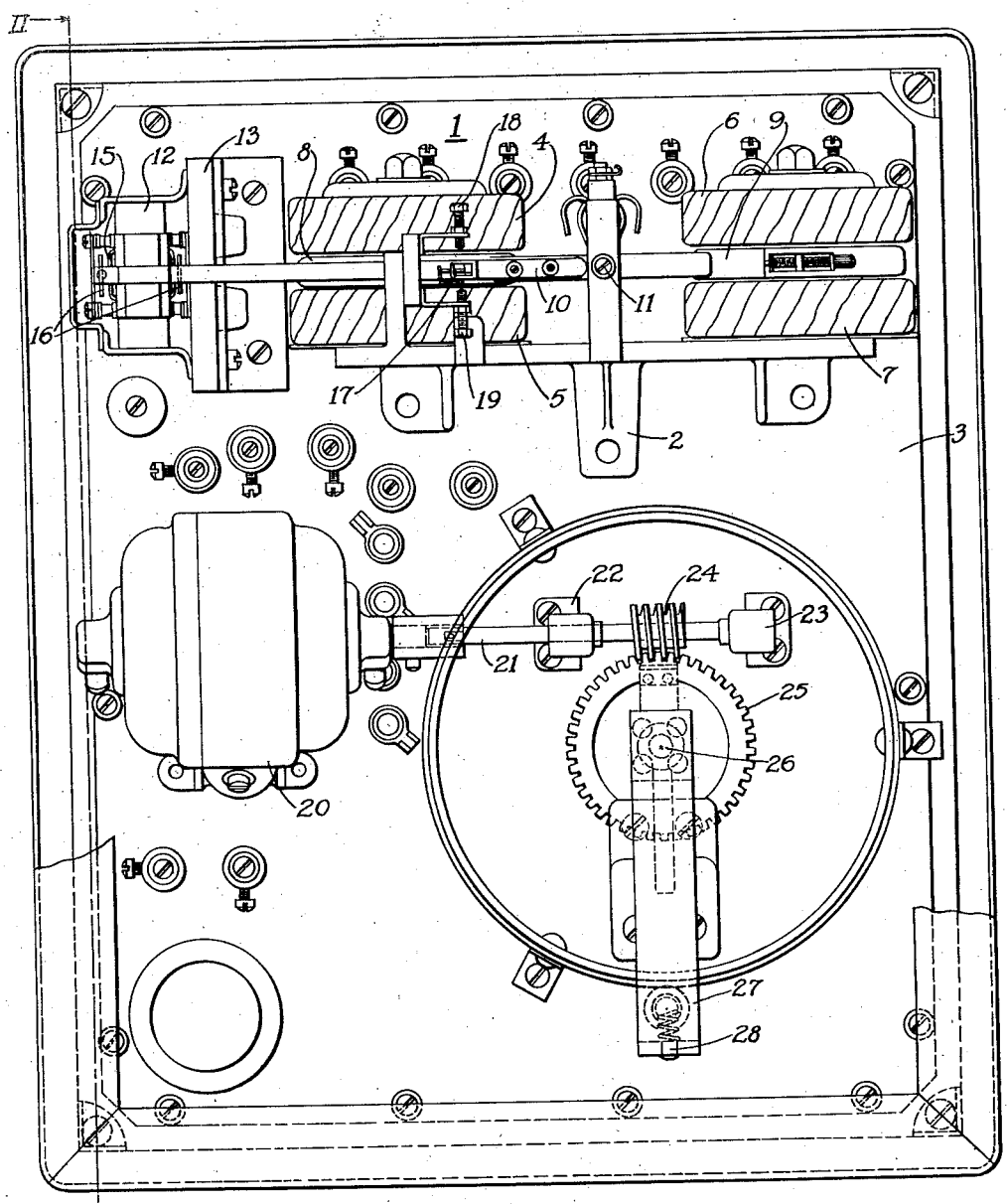
Figure 1 is a front elevational view of a Kelvin balance and associated apparatus that may be located at a substation and associated with a circuit the energy in which it is desired to measure.
Figure 2:
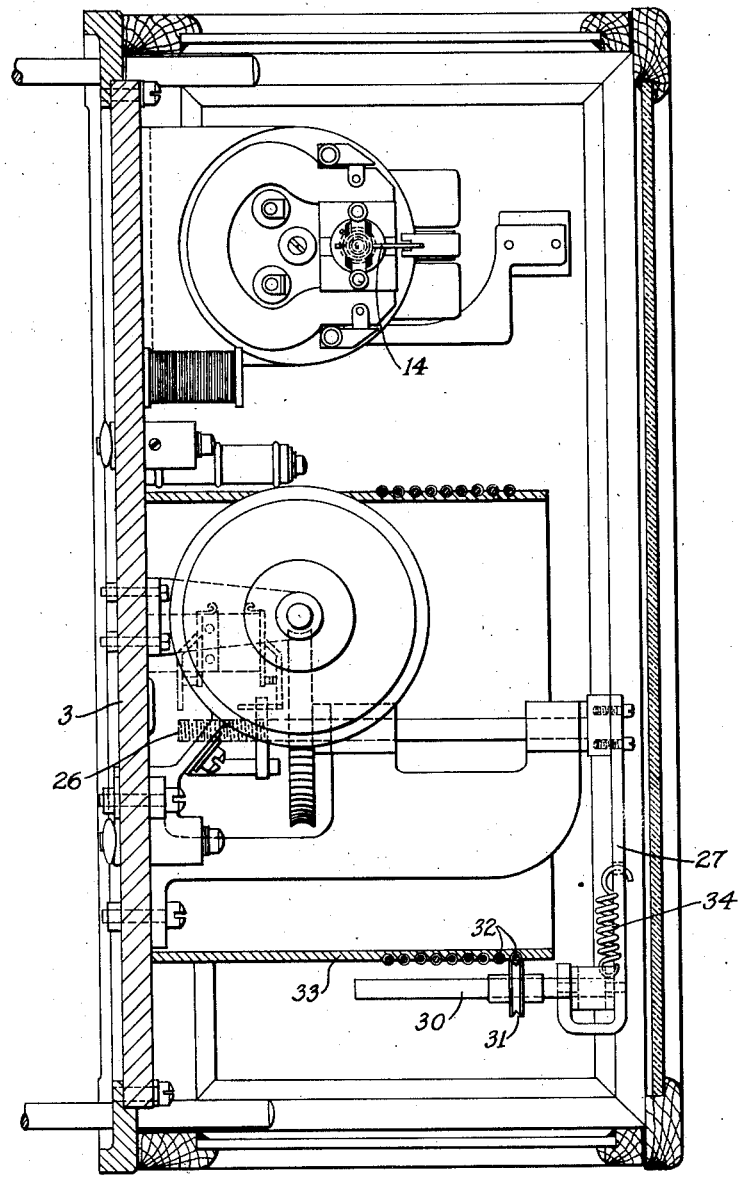
Fig. 2 is a side view, partly in section and partly in elevation, of the apparatus including the Kelvin balance shown in Fig. 1.
Figure 3:
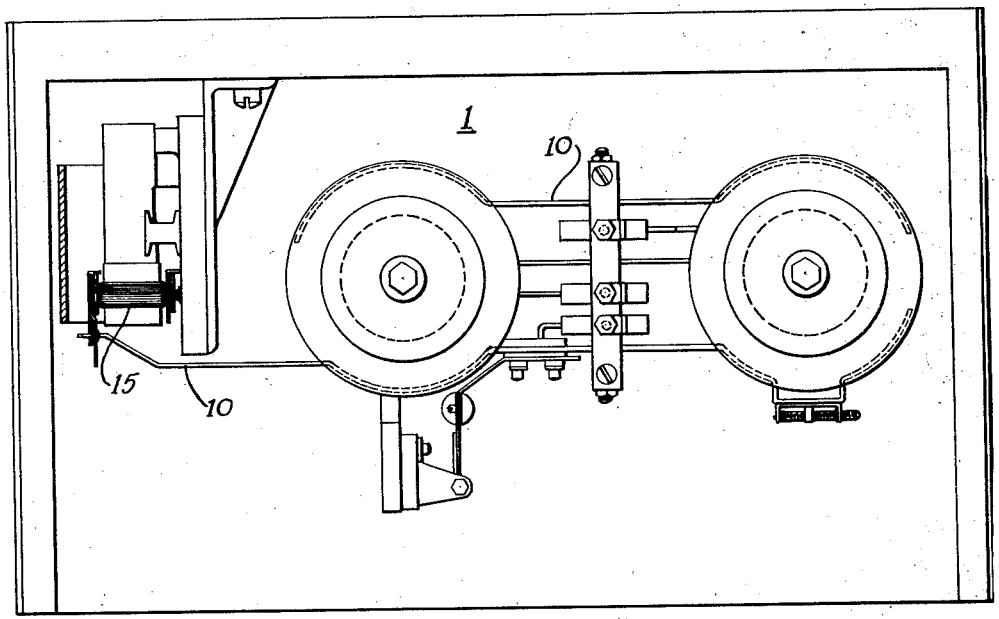
Fig. 3 is a top plan view of the Kelvin balance and an associated ammeter.

Referring now more particularly to Figs. 1, 2 and 3, the device 1 is an ordinary Kelvin balance wattmeter which is mounted upon a bracket 2 that is attached to a base 3. The Kelvin balance comprises stationary coils 4, 5, 6 and 7 and movable coils 8 and 9. The movable coils 8 and 9 are mounted upon a frame 10 which is pivoted, at 11, upon an extension of the bracket 2.

An ordinary D'Arsonval type of ammeter 12 is mounted upon a bracket 13, which is also attached to base 3. An extension of the frame 10 that carries the movable coils 8 and 9 of the Kelvin balance is connected to an armature 15 of the ammeter 12 by an arm 14, acting through a connecting strip 16 that is connected to the extension of the frame 10. The frame 10 also carries a contact-making device 17 that is adapted to engage one of the contact members 18 or 19, depending upon the movement of the movable coils. The contact members 18 and 19 are also mounted upon the bracket 2.

The contact members 17, 18 and 19 are adapted to control a motor 20, that is attached to the base 3. A shaft 21 is driven by the motor 20 and is supported by the brackets 22 and 23 that are mounted upon the base 3. The shaft 21 carries a worm 24 that meshes with a worm wheel 25. The worm wheel 25 is mounted on a shaft 26. The shaft 26 also carries an arm 27 that carries a shaft 30. The shaft 30 carries a longitudinally movable and freely rotatable contact-making wheel 31. The contact-making wheel 31 is adapted to engage a resistor 32 that is formed by winding resistance wire spirally around an asbestos center. The resistor thus formed is wound spirally upon a drum 33 attached to the base 3. The contact-making wheel 31 is forced against the wire forming the resistor by means of a spring 34 carried on the shaft 26.

It will be seen that, as the motor 20 turns the shaft 21, the worm wheel 25 turns the arm 27 and, consequently, the contact-making wheel 31, thereby moving this wheel into engagement with various portions of the spirally wound resistor, the contact wheel 31 being free to move longitudinally on the shaft 30 in accordance with the direction of movement of the motor which is controlled by the operation of the movable coils 8 and 9 in the Kelvin balance 1.

With reference to Figs. 1 to 4, inclusive, the operation of the device is a follows: In accordance with the variations in the power in the circuit 50, the frame 10 is so moved as to operate the contact-making member 17 into engagement with the contact member 18 or 19 under the influence of the coils 8 and 9 and 4, 5, 6 and 7. Assuming that the contact-making member 17 is forced into engagement with the contact member 19, a circuit is completed for the motor 20. The motor 20 then turns the shaft 21, thereby causing the contact-making wheel 31 to include less resistance in the circuit, thus decreasing the voltage and applying less current to the movable coil 15 of the ammeter 12. This operation assumes that the power in the circuit 50 has decreased.

As a consequence of this operation, the torque developed by the armature 15 of the ammeter 12 is lessened until it equals the torque exerted upon the frame 10 by the winding of the Kelvin balance. This causes the contacts 17 and 19 to be disengaged.

In the event that the power in the circuit increases, the contact-making member 17 will be forced into engagement with the contact member 18 and a circuit will be closed for the motor 20 to cause it to turn in the opposite direction to that previously described. As a result, the contact wheel 31 will operate to increase the resistance causing higher voltage to be applied to the movable coil 15 of the ammeter 12, and the movable coil 15, having more current flowing through it, will develop an increased torque against the movement of the frame 10. When a balance is obtained between the torque exerted by the coil 15 and that exerted by the movable coils 8 and 9, the contact-making member 17 will be forced out of engagement with the contact member 18 and the operation of the device will cease. The ammeter 12 serves as a balancing agent for the balance and, consequently, takes the place of the ordinary balancing device used for that purpose.

It will be seen that there is a receiving meter 51 placed in series with the movable coil 15 of the ammeter 12. Thus, in accordance with the variation in current by the operation of the contact-making wheel 31, the receiving meter will respond thereto and show, at the distant point, the load in the circuit 50. This receiving meter may be of any suitable type and may record the variations in load graphically, in any well known manner.

It will be seen that, if there is a decrease in the voltage of the current source 35 or an increase in the resistance of the transmission circuit 52, 53, the movable coil 15 of the ammeter 12 will exert less force upon the frame 10 and the contact-making member 17 of the Kelvin balance 1 will be forced into engagement with the contact member 19, thereby increasing the amount of voltage applied to the ammeter element until the current reaches the original value.

In like manner, in the event that there is an increase in voltage in the current source 35 or a decrease in the resistance of the transmission circuit, the movable coil 15 of the ammeter 12 will exert a greater torque upon the frame 10 and the motor 20 will be operated to cause the voltage applied to the ammeter to be reduced to the previous value.

By means of the above arrangements, it will be seen that the Kelvin balance is made to operate positively and uniformly in either direction in accordance with variations in the current source 35, and also that variations in the voltage of the current source or in the resistance of the transmission circuit do not affect the accuracy of the transmission.

It will be apparent that it is possible to measure the total power in a number of circuits by the receiving meter 51. To accomplish this result, it is only necessary to connect a device or devices, similar to the one described, in multiple with the line wires 52 and 53. As this device is in multiple, there will be, consequently, a greater current flow through the receiving meter 51 and a greater indication will be given. It is thus possible to measure the total power in a number of circuits located at a remotely-disposed point with respect to the receiving meter.

It will be seen that it is also possible to telephone over the wires 52 and 53, by reason of the fact that the telephone circuits are conductively separated from the line wires 52 and 53 by means of condensers, while the apparatus for measuring and receiving the power measurements are connected to the telephone circuit through impedance coils. By this arrangement, the two circuits will cause no interference with each other.

While I have shown my invention applied to a device for measuring the power in a remotely-disposed circuit, it will be apparent that a similar device may send and receive the voltage, current, or, in fact, any quantity of an electric circuit.

My invention is not limited to the particular arrangement of the apparatus illustrated, but may be modified without departing from the spirit and scope thereof, as set forth in the appended claims.

I claim as my invention:

1. A transmitting instrument for a metering system comprising a Kelvin-balance element, a D'Arsonval ammeter having a movable coil mechanically coupled to said Kelvin-balance element and means for controlling the current through said ammeter to maintain said Kelvin-balance element in equilibrium.

2. A transmitting instrument for a metering system comprising a movable Kelvin-balance element, a lever arm secured thereto, a D'Arsonval ammeter having a pivoted coil, a lever arm secured thereto and to the first-mentioned lever arm, a variable resistor connected in series with said ammeter, a motor controlling said resistor and a contact member on said Kelvin-balance element in the circuit of said motor.

3. A transmitting instrument for a metering system comprising a base, a motor and a control element mounted on said base, a cylindrical drum of insulating material adjacent to said motor, a shaft mounted concentrically in said drum and driven by said motor, a resistor element wound in a helical coil on said drum and a movable contact member mounted on said shaft and engaging said resistor element.

4. A transmitting instrument for a metering system comprising a base, a motor and a control element mounted on said base, a contact member on said control element in the circuit of said motor, a cylindrical drum of insulating material adjacent to said motor, a shaft mounted concentrically in motor, a shaft mounted concentrically in said drum and driven by said motor, a resistor element wound in a helical coil on the exterior of said drum and connected to a winding on said control element, a supporting member on said shaft adjacent to said resistor element and a contact member mounted upon said supporting member for transverse movement along the surface of said drum and engaging said resistor element.

5. A transmitting instrument for a metering system comprising a Kelvin-balance element, a D'Arsonval ammeter coupled to said Kelvin-balance and means for controlling the current through said ammeter to maintain said Kelvin-balance in equilibrium.

6. In a metering system, a Kelvin-balance comprising an element connected to measure current in a power circuit, a second element, a D'Arsonval ammeter coupled to said second element and means for controlling the current through said ammeter to maintain said second element in equilibrium.

7. In a metering system a Kelvin-balance comprising a first element connected to a power system, a second element normally balanced, a D'Arsonval ammeter coupled to said second element and means for controlling the current through said ammeter to maintain said balance in equilibrium.

In testimony whereof, I have hereunto subscribed my name this 27th day of December, 1923.

RAYMOND T. PIERCE.